US008461262B2

(12) United States Patent
McEneany et al.

(10) Patent No.: US 8,461,262 B2
(45) Date of Patent: Jun. 11, 2013

(54) POLYLACTIC ACID FIBERS

(75) Inventors: Ryan J. McEneany, Appleton, WI (US);
Vasily A. Topolkaraev, Appeton, WI (US); Aimin He, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/553,912

(22) Filed: Jul. 20, 2012

(65) Prior Publication Data

US 2012/0289658 A1    Nov. 15, 2012

Related U.S. Application Data

(62) Division of application No. 12/989,450, filed on Dec. 7, 2010, now Pat. No. 8,268,738.

(51) Int. Cl.
*C08L 67/00* (2006.01)
*C08L 67/04* (2006.01)
*C08G 63/08* (2006.01)

(52) U.S. Cl.
USPC ............. 525/64; 525/69; 525/166; 525/176; 428/364

(58) Field of Classification Search
USPC ................. 525/64, 69, 166, 176; 428/364
See application file for complete search history.

(56) References Cited

U.S. PATENT DOCUMENTS

| | | |
|---|---|---|
| 3,884,850 A | 5/1975 | Ostrowski |
| 4,434,078 A | 2/1984 | Kaneko |
| 4,554,344 A | 11/1985 | Jackson, Jr. et al. |
| 4,596,660 A | 6/1986 | Hou |
| 4,797,468 A | 1/1989 | De Vries |
| 4,970,288 A | 11/1990 | Larkin et al. |
| 5,130,073 A | 7/1992 | Meirowitz et al. |
| 5,166,310 A | 11/1992 | Rooney |
| 5,310,599 A | 5/1994 | Ford |
| 5,378,801 A | 1/1995 | Reichert et al. |
| 5,466,517 A | 11/1995 | Eschwey et al. |
| 5,470,944 A | 11/1995 | Bonsignore |
| 5,521,278 A | 5/1996 | O'Brien et al. |
| 5,525,706 A | 6/1996 | Gruber et al. |
| 5,543,494 A | 8/1996 | Perego et al. |
| 5,574,129 A | 11/1996 | Miyoshi et al. |
| 5,593,778 A | 1/1997 | Kondo et al. |
| 5,614,298 A | 3/1997 | Tanaka et al. |
| 5,633,342 A | 5/1997 | Verser et al. |
| 5,714,569 A | 2/1998 | Imaizumi et al. |
| 5,763,564 A | 6/1998 | Gruber et al. |
| 5,770,682 A | 6/1998 | Ohara et al. |
| 5,807,973 A | 9/1998 | Gruber et al. |
| 5,817,721 A | 10/1998 | Warzelhan et al. |
| 5,821,327 A | 10/1998 | Oota et al. |
| 5,844,066 A | 12/1998 | Kakizawa |
| 5,866,677 A | 2/1999 | Maeda et al. |
| 5,880,254 A | 3/1999 | Ohara et al. |
| 5,883,199 A | 3/1999 | McCarthy et al. |
| 5,900,322 A | 5/1999 | Buchanana et al. |
| 5,910,545 A | 6/1999 | Tsai et al. |
| 5,912,275 A | 6/1999 | Hall et al. |
| 5,922,832 A * | 7/1999 | Randall et al. ............... 528/354 |
| 5,952,433 A | 9/1999 | Wang et al. |
| 5,965,648 A | 10/1999 | Brink et al. |
| 5,981,694 A | 11/1999 | Gruber et al. |
| 6,045,908 A | 4/2000 | Nakajima et al. |
| 6,063,895 A | 5/2000 | Chung et al. |
| 6,096,855 A | 8/2000 | Sodergard et al. |
| 6,111,060 A | 8/2000 | Gruber et al. |
| 6,117,928 A | 9/2000 | Hiltunen et al. |
| 6,143,863 A | 11/2000 | Gruber et al. |
| 6,177,193 B1 | 1/2001 | Tsai et al. |
| 6,180,287 B1 | 1/2001 | Watanabe et al. |
| 6,194,483 B1 | 2/2001 | Tsai et al. |
| 6,197,237 B1 | 3/2001 | Tsai et al. |
| 6,197,860 B1 | 3/2001 | Tsai et al. |
| 6,201,068 B1 | 3/2001 | Tsai et al. |
| 6,207,617 B1 | 3/2001 | Gillespie |
| 6,218,321 B1 | 4/2001 | Lorcks et al. |
| 6,225,388 B1 | 5/2001 | Tsai et al. |
| 6,235,393 B1 | 5/2001 | Kimura et al. |
| 6,245,831 B1 | 6/2001 | Tsai et al. |
| 6,258,924 B1 | 7/2001 | Warzelhan et al. |
| 6,262,294 B1 | 7/2001 | Sako et al. |
| 6,268,434 B1 | 7/2001 | Tsai et al. |
| 6,326,458 B1 | 12/2001 | Gruber et al. |

(Continued)

FOREIGN PATENT DOCUMENTS

| | | |
|---|---|---|
| DE | 4200320 A1 | 7/1993 |
| EP | 0731198 A2 | 9/1996 |

(Continued)

OTHER PUBLICATIONS

Article—Cooper-White et al., "Rheological Properties of Poly(lactides). Effect of Molecular Weight and Temperature on the Viscoelasticity of Poly(*l*-lactic acid)," *Journal of Polymer Science: Part B: Polymer Physics*, vol. 37, 1999, pp. 1803-1814.

(Continued)

*Primary Examiner* — Ana Woodward
(74) *Attorney, Agent, or Firm* — Dority & Manning, P.A.

(57) ABSTRACT

A biodegradable fiber that is formed from a thermoplastic composition that contains polylactic acid, a plasticizer, and a compatibilizer is provided. The compatibilizer includes a polymer that is modified with a polar compound that is compatible with the plasticizer and a non-polar component provided by the polymer backbone that is compatible with polylactic acid. Such functionalized polymers may thus stabilize each of the polymer phases and reduce plasticizer migration. By reducing the plasticizer migration, the composition may remain ductile and soft. Further, addition of the functionalized polymer may also promote improved bonding and initiate crystallization faster than conventional polylactic acid fibers. The polar compound includes an organic acid, an anhydride of an organic acid, an amide of an organic acid, or a combination thereof. Such compounds are believed to be more compatible with the generally acidic nature of the polylactic acid fibers.

17 Claims, 1 Drawing Sheet

U.S. PATENT DOCUMENTS

| | | |
|---|---|---|
| 6,355,772 B1 * | 3/2002 | Gruber et al. ............... 528/354 |
| 6,376,580 B1 | 4/2002 | Ikuta et al. |
| 6,399,716 B2 | 6/2002 | Chung et al. |
| 6,420,027 B2 | 7/2002 | Kimura et al. |
| 6,500,897 B2 | 12/2002 | Wang et al. |
| 6,506,873 B1 | 1/2003 | Ryan et al. |
| 6,521,336 B2 | 2/2003 | Narita et al. |
| 6,552,124 B2 | 4/2003 | Wang et al. |
| 6,562,939 B1 | 5/2003 | Farachi et al. |
| 6,579,934 B1 | 6/2003 | Wang et al. |
| 6,607,996 B1 | 8/2003 | Matsunaga et al. |
| 6,667,385 B2 | 12/2003 | Pierce et al. |
| 6,713,595 B2 | 3/2004 | Chung et al. |
| 6,780,964 B2 | 8/2004 | Satoh et al. |
| 6,787,493 B1 | 9/2004 | Nagaoka et al. |
| 6,787,632 B2 | 9/2004 | Phelps et al. |
| 6,838,403 B2 | 1/2005 | Tsai et al. |
| 6,946,506 B2 | 9/2005 | Bond et al. |
| 6,953,622 B2 | 10/2005 | Tsai et al. |
| 7,037,983 B2 | 5/2006 | Huang et al. |
| 7,053,151 B2 | 5/2006 | Wang et al. |
| 7,067,611 B2 | 6/2006 | Yamane et al. |
| 7,193,032 B2 | 3/2007 | Culbert et al. |
| 7,196,157 B2 | 3/2007 | Bastioli et al. |
| 7,256,223 B2 | 8/2007 | Mohanty et al. |
| 7,288,618 B2 | 10/2007 | Bastioli et al. |
| 7,332,562 B2 | 2/2008 | Chen et al. |
| 7,361,725 B2 | 4/2008 | Yu |
| 7,368,503 B2 | 5/2008 | Hale |
| 2003/0022581 A1 | 1/2003 | Tsai et al. |
| 2003/0204180 A1 | 10/2003 | Huang et al. |
| 2004/0266983 A1 | 12/2004 | Reeve et al. |
| 2009/0203281 A1 | 8/2009 | He et al. |
| 2009/0291607 A1 | 11/2009 | Wang et al. |
| 2009/0311937 A1 | 12/2009 | He et al. |
| 2010/0048081 A1 | 2/2010 | Topolkaraev et al. |
| 2010/0048082 A1 | 2/2010 | Topolkaraev et al. |
| 2010/0323575 A1 | 12/2010 | He et al. |
| 2011/0059669 A1 | 3/2011 | He et al. |

FOREIGN PATENT DOCUMENTS

| | | |
|---|---|---|
| EP | 0731198 A3 | 9/1996 |
| EP | 0755956 A2 | 1/1997 |
| EP | 0755956 A3 | 1/1997 |
| EP | 0905292 A1 | 3/1999 |
| EP | 1215225 A1 | 6/2002 |
| EP | 1236753 A1 | 9/2002 |
| EP | 1345979 B1 | 7/2004 |
| EP | 1000102 B1 | 11/2005 |
| EP | 1497353 B1 | 12/2005 |
| JP | 62156995 A | 7/1987 |
| JP | 7109659 A | 4/1995 |
| JP | 7125128 A | 5/1995 |
| JP | 8199052 A | 7/1996 |
| JP | 8199052 A | 8/1996 |
| JP | 8283557 A | 10/1996 |
| JP | 9241417 A | 9/1997 |
| JP | 11043857 A | 2/1999 |
| JP | 11050369 A | 2/1999 |
| JP | 11117164 A | 4/1999 |
| JP | 11286864 A | 10/1999 |
| JP | 2001136300 A | 5/2000 |
| JP | 2003183934 A | 7/2003 |
| JP | 2005048350 A | 2/2005 |
| KR | 2004005193 A | 1/2004 |
| KR | 20040005194 A | 1/2004 |
| WO | WO 9741165 A1 | 11/1997 |
| WO | WO 9836008 A1 | 8/1998 |
| WO | WO 9850611 A1 | 11/1998 |
| WO | WO 9928368 A1 | 6/1999 |
| WO | WO 0114621 A1 | 3/2001 |
| WO | WO 03089492 A1 | 10/2003 |
| WO | WO 03089493 A1 | 10/2003 |
| WO | WO 2004048471 A1 | 6/2004 |
| WO | WO 2004061172 A2 | 7/2004 |
| WO | WO 2004061172 A3 | 7/2004 |
| WO | WO 2005061617 A1 | 7/2005 |
| WO | WO 2005092948 A2 | 10/2005 |
| WO | WO 2005092948 A3 | 10/2005 |
| WO | WO 2006097353 A1 | 9/2006 |
| WO | WO 2007004906 A1 | 1/2007 |
| WO | WO 2007070064 A1 | 6/2007 |
| WO | WO 2008008067 A1 | 1/2008 |
| WO | WO 2008008068 A1 | 1/2008 |
| WO | WO 2008008074 A1 | 1/2008 |
| WO | WO 2008073099 A1 | 6/2008 |

OTHER PUBLICATIONS

Article—Kulinski et al., "Plasticization of Poly(L-lactide) with Poly(propylene glycol)," *Biomacromolecules*, vol. 7, No. 7, 2006, pp. 2128-2135.

Article—Witt et al., "Biodegradation of aliphatic-aromatic copolyesters: evaluation of the final biodegradability and ecotoxicological impact of degradation intermediates," *Chemosphere* 44, 2001, pp. 289-299.

Search Report and Written Opinion for PCT/US2006/047852 dated Jun. 15, 2007, 15 pages.

\* cited by examiner

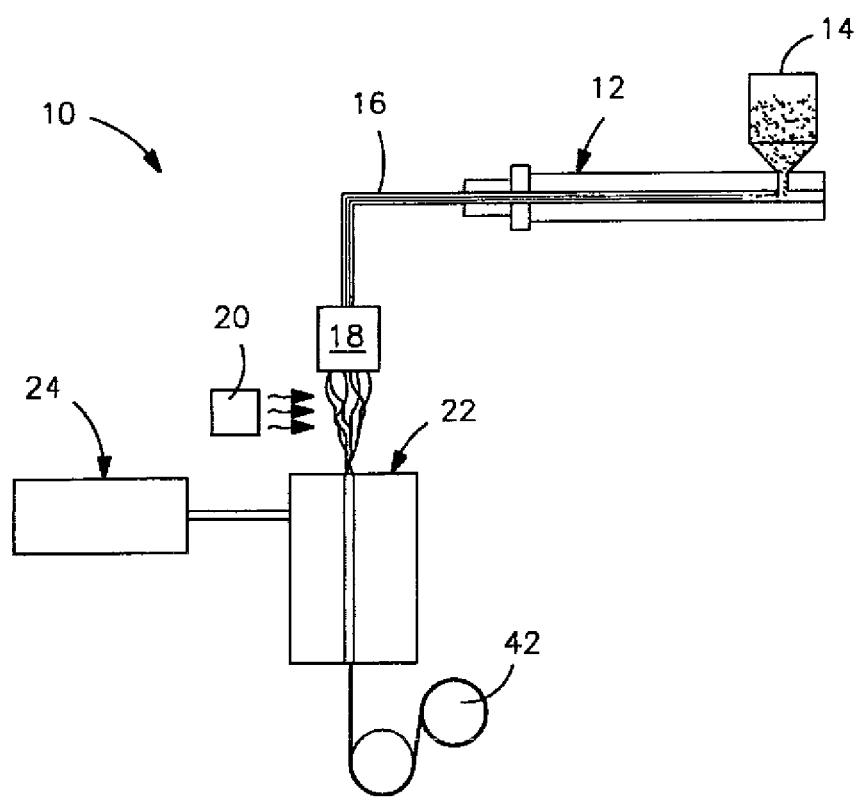

POLYLACTIC ACID FIBERS

RELATED APPLICATIONS

The present application is a divisional of U.S. application Ser. No. 12/989,450, filed on Oct. 25, 2010, which is incorporated herein in its entirety by reference thereto for all purposes.

BACKGROUND OF THE INVENTION

Various attempts have been made to form nonwoven webs from biodegradable polymers. Although fibers prepared from biodegradable polymers are known, problems have been encountered with their use. For example, polylactic acid ("PLA") is one of the most common biodegradable and sustainable (renewable) polymers used to form nonwoven webs. Unfortunately, PLA nonwoven webs generally possess a low bond flexibility and high roughness due to the high glass transition temperature and slow crystallization rate of polylactic acid. In turn, thermally bonded PLA nonwoven webs often exhibit low elongations that are not acceptable in certain applications, such as in an absorbent article. Likewise, though polylactic acid may withstand high draw ratios, it requires high levels of draw energy to achieve the crystallization needed to overcome heat shrinkage. Plasticizers have been employed in an attempt to reduce the glass transition temperature and improve bonding and softness. Unfortunately, however, the addition of plasticizers causes other problems, such as degradation in melt spinning, reduction in melt strength and drawability, and an increased tendency to phase separate and migrate out of the fiber structure during aging, thus reducing plasticizer effectiveness over time.

As such, a need currently exists for fibers that are biodegradable and exhibits good mechanical properties.

SUMMARY OF THE INVENTION

In accordance with one embodiment of the present invention, a biodegradable fiber is disclosed that is formed from a thermoplastic composition comprising at least one polylactic acid in an amount from about 55 wt. % to about 97 wt. %, at least one plasticizer in an amount from about 2 wt. % to about 25 wt. %, and at least one compatibilizer in an amount of from about 1 wt. % to about 20 wt. %. The compatibilizer includes a polymer modified with a polar compound. The polar compound includes an organic acid, an anhydride of an organic acid, an amide of an organic acid, or a combination thereof.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which:

FIG. 1 is a schematic illustration of a process that may be used in one embodiment of the present invention to form fibers.

Repeat use of references characters in the present specification and drawing is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "fibers" refer to elongated extrudates formed by passing a polymer through a forming orifice such as a die. Unless noted otherwise, the term "fibers" includes discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed from one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, segmented pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Krueqe, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the term "multiconstituent" refers to fibers formed from at least two polymers (e.g., biconstituent fibers) that are extruded as a blend. The polymers are not arranged in substantially constantly positioned distinct zones across the cross-section of the fibers. Various multiconstituent fibers are described in U.S. Pat. No. 5,108,827 to Gessner, which is incorporated herein in its entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers.

DETAILED DESCRIPTION

Generally speaking, the present invention is directed to a biodegradable fiber that is formed from a thermoplastic composition that contains polylactic acid, a plasticizer, and a compatibilizer. Polylactic acid is relatively non-polar in nature and thus not readily compatible with polar plasticizers, such as polyethylene glycols. When forming a resin from such polymers, a separated interface may thus form between two phases, which deteriorates the mechanical properties of the resulting fibers. In this regard, the present inventors have discovered that functionalized polymers are particularly effective for use in compatibilizing polylactic acid with a plasticizer. Namely, a generally non-polar polymer is modified with a polar compound that is compatible with the plasticizer. Such a functionalized polymer may thus stabilize each of the polymer phases and reduce plasticizer migration. By reducing the plasticizer migration, the composition may remain ductile and soft. Further, addition of the functionalized polymer may also promote improved bonding and initiate crystallization faster than conventional polylactic acid fibers. The polar compound includes an organic acid, an anhydride of an organic acid, an amide of an organic acid, or a combination thereof. Such compounds are believed to be more compatible with the generally acidic nature of the polylactic acid fibers.

Various embodiments of the present invention will now be described in more detail.

I. Thermoplastic Composition

A. Polylactic Acid

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.) to provided a variety of different of benefits, such as processing, fiber formation, etc.

In one particular embodiment, the polylactic acid has the following general structure:

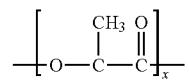

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a melting point of from about 100° C. to about 240° C., in some embodiments from about 120° C. to about 220° C., and in some embodiments, from about 140° C. to about 200° C. Such polylactic acids are useful in that they biodegrade at a fast rate. The glass transition temperature ("$T_g$") of the polylactic acid may be relatively high, such as from about 20° C. to about 80° C., in some embodiments from about 30° C. to about 70° C., and in some embodiments, from about 40° C. to about 65° C. As discussed in more detail below, the melting temperature and glass transition temperature may all be determined using differential scanning calorimetry ("DSC") in accordance with ASTM D-3417.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes. The melt flow rate is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E or D-1239.

B. Plasticizer

A plasticizer is employed to improve a variety of characteristics of the resulting thermoplastic composition, including its ability to be melt processed into fibers and webs. Suitable plasticizers for polylactic acid include, for instance, phthalates; esters (e.g., citrate esters, phosphate esters, ether diesters, carboxylic esters, dicarboxylic esters, epoxidized esters, aliphatic diesters, polyesters, copolyesters, etc.); alkylene glycols (e.g., ethylene glycol, diethylene glycol, triethylene glycol, tetraethylene glycol, propylene glycol, polyethylene glycol, polypropylene glycol, poly-1,3-propanediol, polybutylene glycol, etc.); alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, 1,3-cyclohexanedimethanol, 1,4-cyclohexanedimethanol, 2,2,4,4-tetramethyl-1,3-cyclobutanediol, etc.); alkylene oxides (e.g., polyethylene oxide, polypropylene oxide, etc.); vegetable oils; polyether copolymers; and so forth. Certain plasticizers, such as alkylene glycols, alkane diols, alkylene oxides, etc., may possess one or more hydroxyl groups that can attack the ester linkages of the polylactic acid and result in chain scission, thus improving the flexibility of the polylactic acid. Polyethylene glycol ("PEG"), for instance, is an example of a plasticizer that is particularly effective in decreasing the constraints on mobility and as a result helps provide a higher crystallization rate within a broader thermal window. Suitable PEGs are commercially available from a variety of sources under designations such as PEG 600, PEG 3350, PEG 8000, etc. Examples of such PEGs include Carbowax™, which is available from Dow Chemical Co. of Midland, Mich.

Another suitable plasticizer that may be employed in the present invention is a polyether copolymer contains a repeating unit (A) having the following formula:

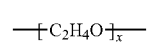 (A)

wherein,
x is an integer from 1 to 250, in some embodiments from 2 to 200, and in some embodiments, from 4 to 150, and also a repeating unit (B) having the following formula:

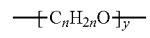 (B)

wherein,
n is an integer from 3 to 20, in some embodiments from 3 to 10, and in some embodiments, from 3 to 5; and
y is an integer from 1 to 150, in some embodiments from 2 to 125, and in some embodiments, from 4 to 100. Specific examples of monomers for use in forming the repeating unit (B) may include, for instance, 1,2-propanediol ("propylene glycol"); 1,3-propanediol ("trimethylene glycol"); 1,4-butanediol ("tetramethylene glycol"); 2,3-butanediol ("dimethylene glycol"); 1,5-pentanediol; 1,6-hexanediol; 1,9-nonanediol; 2-methyl-1,3-propanediol; neopentyl glycol; 2-methyl-1,4-butanediol; 3-methyl-1,5-pentanediol; 3-oxa-1,5-pentanediol ("diethylene glycol"); spiro-glycols, such as 3,9-bis(1,1-dimethyl-2-hydroxyethyl)-2,4,8,10-tetraoxaspiro [5,5]undecane and 3,9-diethanol-2,4,8,10-tetraoxaspiro[5,5]undecane; and so forth. Among these polyols, propylene glycol, dimethylene glycol, trimethylene glycol, and tetramethylene glycol are particularly suitable for use in the present invention. In one particular embodiment, for example, the polyether copolymer may have the following general structure:

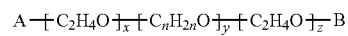

wherein,
x is an integer from 1 to 250, in some embodiments from 2 to 200, and in some embodiments, from 4 to 150;
y is an integer from 1 to 150, in some embodiments from 2 to 125, and in some embodiments, from 4 to 100;
z is an integer from 0 to 200, in some embodiments from 2 to 125, and in some embodiments from 4 to 100;
n is an integer from 3 to 20, in some embodiments from 3 to 10, and in some embodiments, from 3 to 6;
A is hydrogen, an alkyl group, an acyl group, or an aryl group of 1 to 10 carbon atoms, and
B is hydrogen, an alkyl group, an acyl group, or an aryl group of 1 to 10 carbon atoms. When "z" is greater than 0, for example, the copolymer has an "ABA" configuration and may include, for instance, polyoxyethylene/polyoxypropylene/polyoxyethylene copolymers (EO/PO/EO) such as described in U.S. Patent Application Publication No. 2003/0204180 to Huang, et al., which is incorporated herein in its entirety by reference thereto for all purposes. Suitable EO/PO/EO polymers for use in the present invention are commercially available under the trade name PLURONIC® (e.g., F-127 L-122, L-92, L-81, and L-61) from BASF Corporation, Mount Olive, N.J.

C. Compatibilizer

The compatibilizer of the present invention includes a polymer modified with a polar compound. Suitable polymers for use in the compatibilizer may include, for instance, polyolefins; polyesters, such as aliphatic polyesters (e.g., polylactic acid, polybutylene succinate, etc.), aromatic polyesters (e.g., polyethylene terephthalate, polybutylene terephthalate, etc.), aliphatic-aromatic copolyesters, etc.; and so forth. In one particular embodiment, a polyolefin is employed in the compatibilizer such that the non-polar component is provided by the olefin. The olefin component may generally be formed from any linear or branched α-olefin monomer, oligomer, or polymer (including copolymers) derived from an olefin monomer. The α-olefin monomer typically has from 2 to 14 carbon atoms and preferably from 2 to 6 carbon atoms. Examples of suitable monomers include, but not limited to, ethylene, propylene, butene, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers. An olefin copolymer can include a minor amount of non-olefinic monomers, such as styrene, vinyl acetate, diene, or acrylic and non-acrylic monomer.

The polar compound may be incorporated into the polymer backbone using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing polar functional groups may be copolymerized with a monomer to form a block or random copolymer.

Regardless of the manner in which it is incorporated, the polar compound of the compatibilizer includes an organic acid, an anhydride of an organic acid, an amide of an organic acid, or a combination thereof, so that the resulting compatibilizer contains a carboxyl group, acid anhydride group, acid amide group, carboxylate group, etc. In addition to imparting polarity to the polymer, such compounds are also believed to be more compatible with the acidic nature of the polylactic acid fibers. Examples of compounds include aliphatic carboxylic acids; aromatic carboxylic acids; esters; acid anhydrides and acid amides of these acids; imides derived from these acids and/or acid anhydrides; and so forth. Particularly suitable compounds are maleic anhydride, maleic acid, fumaric acid, maleimide, maleic acid hydrazide, a reaction product of maleic anhydride and diamine, methylnadic anhydride, dichloromaleic anhydride, acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, elcosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amides or anhydrides of any of the acids noted above; etc.

Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corporation under the designation Polybond® and Eastman Chemical Company under the designation Eastman G series.

Regardless of the specific manner in which it is formed, a variety of aspects of the compatibilizer may be selectively controlled to optimize its ability to be employed in a fiber-forming process. For example, the weight percentage of polar compound in the compatibilizer may influence fiber drawing and the ability to blend together the plasticizer and polylactic acid. If the polar compound modification level is too high, for instance, fiber drawing may be restricted due to strong molecular interactions and physical network formation by the polar groups. Conversely, if the polar compound modification level is too low, compatibilization efficiency may be reduced. Thus, the polar compound (e.g., maleic anhydride) typically constitutes from about 0.2 wt. % to about 10 wt. %, in some embodiments from about 0.5 wt. % to about 5 wt. %, and in some embodiments, from about 1 wt. % to about 3 wt. % of the compatibilizer. Likewise, the polymer typically constitutes from about 90 wt. % to about 99.8 wt. %, in some embodiments from about 95 wt. % to about 99.5 wt. %, and in some embodiments, from about 97 wt. % to about 99 wt. % of the compatibilizer. In addition, the melt flow rate of the compatibilizer may also be controlled so that melt fiber spinning is not adversely affected. For instance, the melt flow rate of the compatibilizer may range from about 100 to about 600 grams per 10 minutes, in some embodiments from about 200 to about 500 grams per 10 minutes, and in some embodiments, from about 250 to about 450 grams per 10 minutes, measured at a load of 2160 grams at a temperature of 190° C. in accordance with ASTM Test Method D1238-E.

The relative amount of the polylactic acid, plasticizer, and compatibilizer in the thermoplastic composition may also be selectively controlled to achieve a desired balance between biodegradability and the mechanical properties of the resulting fibers and webs. For example, the compatibilizer typically constitutes from about 1 wt. % to about 20 wt. %, in some embodiments from about 2 wt. % to about 15 wt. %, and in some embodiments, from about 4 wt. % to about 10 wt. % of the thermoplastic composition. Likewise, the plasticizer typically constitutes from about 2 wt. % to about 25 wt. %, in some embodiments from about 3 wt. % to about 20 wt. %, and in some embodiments, from about 5 wt. % to about 10 wt. %, of the thermoplastic composition. Polylactic acid also typically constitutes from about 55 wt. % to about 97 wt. %, in some embodiments from about 65 wt. % to about 95 wt. %, and in some embodiments, from about 75 wt. % to about 92 wt. % of the thermoplastic composition.

D. Other Components

Other components may of course be utilized for a variety of different reasons. For instance, water may be employed in the present invention. Under appropriate conditions, water is also capable of hydrolytically degrading the polylactic acid and thus reducing their molecular weight. The hydroxyl groups of water are believed to attack the ester linkages of the polylactic acid, for example, thereby causing chain scission or "depolymerization" of the polylactic acid molecule into one or more shorter ester chains. The shorter chains may include polylactic acids, as well as minor portions of lactic acid monomers or oligomers, and combinations of any of the foregoing. The amount of water employed relative to the thermoplastic composition affects the extent to which the hydrolysis reaction is able to proceed. However, if the water content is too great, the natural saturation level of the polymer may be exceeded, which may adversely affect resin melt properties and the physical properties of the resulting fibers. Thus, in most embodiments of the present invention, the water content is from about 0 to about 5000 parts per million ("ppm"), in some embodiments from about 20 to about 4000 ppm, and in some embodiments, from about 100 to about 3000, and in some embodiments, from about 1000 to about 2500 ppm, based on the dry weight of the starting polymers used in the thermoplastic composition. The water content may be determined in a variety of ways as is known in the art, such as in accordance with ASTM D 7191-05, such as described in more detail below.

The technique employed to achieve the desired water content is not critical to the present invention. In fact, any of a variety of well known techniques for controlling water content may be employed, such as described in U.S. Patent Application Publication Nos. 2005/0004341 to Culbert, et al. and 2001/0003874 to Gillette, et al., which are incorporated herein in their entirety by reference thereto for all purposes. For example, the water content of the starting polymer may be controlled by selecting certain storage conditions, drying conditions, the conditions of humidification, etc. In one embodiment, for example, the polylactic acid may be humidified to the desired water content by contacting pellets of the polymer(s) with an aqueous medium (e.g., liquid or gas) at a specific temperature and for a specific period of time. This enables a targeted water diffusion into the polymer structure (moistening). For example, the polymer may be stored in a package or vessel containing humidified air. Further, the extent of drying of the polymer during manufacture of the polymer may also be controlled so that the thermoplastic composition has the desired water content. In still other embodiments, water may be added during melt processing as described herein. Thus, the term "water content" is meant to include the combination of any residual moisture (e.g., the amount of water present due to conditioning, drying, storage, etc.) and also any water specifically added during melt processing.

Still other materials that may be used include, without limitation, wetting agents, melt stabilizers, processing stabilizers, heat stabilizers, light stabilizers, antioxidants, pigments, surfactants, waxes, flow promoters or melt flow rate modifiers, particulates, nucleating agents, and other materials added to enhance proccessability. For example, a nucleating agent may be employed if desired to improve processing and to facilitate crystallization during quenching. Suitable nucleating agents for use in the present invention may include, for instance, inorganic acids, carbonates (e.g., calcium carbonate or magnesium carbonate), oxides (e.g., titanium oxide, silica, or alumina), nitrides (e.g., boron nitride), sulfates (e.g., barium sulfate), silicates (e.g., calcium silicate), stearates, benzoates, carbon black, graphite, and so forth. Still another suitable nucleating agent that may be employed is a "macrocyclic ester oligomer", which generally refers to a molecule with one or more identifiable structural repeat units having an ester functionality and a cyclic molecule of 5 or more atoms, and in some cases, 8 or more atoms covalently connected to form a ring. The ester oligomer generally contains 2 or more identifiable ester functional repeat units of the same or different formula. The oligomer may include multiple molecules of different formulae having varying numbers of the same or different structural repeat units, and may be a co-ester oligomer or multi-ester oligomer (i.e., an oligomer having two or more different structural repeat units having an ester functionality within one cyclic molecule). Particularly suitable macrocyclic ester oligomers for use in the present invention are macrocyclic poly(alkylene dicarboxylate) oligomers having a structural repeat unit of the formula:

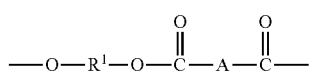

wherein, $R^1$ is an alkylene, cycloalkylene, or a mono- or polyoxyalkylene group, such as those containing a straight chain of about 2-8 atoms; and A is a divalent aromatic or alicyclic group.

Specific examples of such ester oligomers may include macrocyclic poly(1,4-butylene terephthalate), macrocyclic poly(ethylene terephthalate), macrocyclic poly(1,3-propylene terephthalate), macrocyclic poly(1,4-butylene isophthalate), macrocyclic poly(1,4-cyclohexylenedimethylene terephthalate), macrocyclic poly(1,2-ethylene 2,6-naphthalenedicarboxylate) oligomers, co-ester oligomers comprising two or more of the above monomer repeat units, and so forth. Macrocyclic ester oligomers may be prepared by known methods, such as described in U.S. Pat. Nos. 5,039,783; 5,231,161; 5,407,984; 5,527,976; 5,668,186; 6,420,048; 6,525,164; and 6,787,632. Alternatively, macrocyclic ester oligomers that may be used in the present invention are commercially available. One specific example of a suitable macrocyclic ester oligomer is macrocyclic poly(1,4-butylene terephthalate), which is commercially available from Cyclics Corporation under the designation CBT® 100.

When employed, the amount of nucleating agents may be selectively controlled to achieve the desired properties for the fibers. For example, nucleating agents may be present in an amount of about 0.1 wt. % to about 25 wt. %, in some embodiments from about 0.2 wt. % to about 15 wt. %, in some embodiments from about 0.5 wt. % to about 10 wt. %, and in some embodiments, from about 1 wt. % to about 5 wt. %, based on the dry weight of the thermoplastic composition.

II. Melt Processing

The melt processing of the thermoplastic composition and any optional additional components may be performed using any of a variety of known techniques. In one embodiment, for example, the raw materials (e.g., polylactic acid, plasticizer, compatibilizer, etc.) may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., ZSK-30 twin-screw extruder available from Werner & Pfleiderer Corporation of Ramsey, N.J.).

Such extruders may include feeding and venting ports and provide high intensity distributive and dispersive mixing. For example, the polylactic acid, plasticizer, and compatibilizer may be fed to the same or different feeding ports of the twin-screw extruder and melt blended to form a substantially homogeneous melted mixture. If desired, water or other additives (e.g., organic chemicals) may be thereafter injected into the polymer melt and/or separately fed into the extruder at a different point along its length. Alternatively, one or more of the polymers may simply be supplied in a pre-humidified state.

Regardless of the particular melt processing technique chosen, the raw materials may be blended under high shear/pressure and heat to ensure sufficient dispersion. For example, melt processing may occur at a temperature of from about 50° C. to about 500° C., in some embodiments, from about 100° C. to about 350° C., and in some embodiments, from about 150° C. to about 250° C. Likewise, the apparent shear rate during melt processing may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

The resulting thermoplastic composition may have a relatively low glass transition temperature. More specifically, the thermoplastic composition may have a glass transition temperature that is at least about 5° C., in some embodiments at least about 10° C., and in some embodiments, at least about 15° C. less than the glass transition temperature of polylactic acid. For example, the thermoplastic composition may have a $T_g$ of less than about 60° C., in some embodiments from about −10° C. to about 60° C., in some embodiments from about 0° C. to about 55° C., and in some embodiments, from about 10° C. to about 55° C. On the other hand, polylactic acid typically has a $T_g$ of about 60° C. The melting point of the thermoplastic composition may also range from about 50° C. to about 175° C., in some embodiments from about 100° C. to about 170° C., and in some embodiments, from about 120° C. to about 165° C. The melting point of polylactic acid, on the other hand, normally ranges from about 160° C. to about 220° C.

The thermoplastic composition may also crystallize at a higher temperature and at a faster crystallization rate than polylactic acid alone, which may allow the thermoplastic composition to more readily processed. The crystallization temperature may, for instance, be increased so that the ratio of the thermoplastic composition crystallization temperature to the polylactic acid crystallization temperature is greater than 1, in some embodiments at about 1.2 or more, and in some embodiments, about 1.5 or more. For example, the crystallization temperature of the thermoplastic composition may range from about 60° C. to about 130° C., in some embodiments from about 80° C. to about 130° C., and in some embodiments, from about 100° C. to about 120° C. Likewise, the ratio of the crystallization rate during the first cooling cycle (expressed in terms of the latent heat of crystallization, $\Delta H_c$) of the thermoplastic composition to the crystallization rate of the polylactic acid is greater than 1, in some embodiments about 2 or more, and in some embodiments, about 3 or more. For example, the thermoplastic composition may possess a latent heat of crystallization ($\Delta H_c$) during the first cooling cycle of about 10 J/g or more, in some embodiments about 20 J/g or more, and in some embodiments, about 30 J/g or more, as derived from the endothermic melting peak. The thermoplastic composition may also have a latent heat of fusion ($\Delta H_f$) of about 15 Joules per gram ("J/g") or more, in some embodiments about 20 J/g or more, and in some embodiments about 30 J/g or more, and in some embodiments, about 40 J/g or more. Furthermore, the composition may also exhibit a width ($\Delta W_c 1/2$) at the half height of the crystallization peak of about 20° C. or less, in some embodiments about 15° C. or less, in some embodiments about 10° C. or less, and in some embodiments, about 5° C. or less. The composition may also exhibit a width ($\Delta W_f 1/2$) at the half height of the endothermic melting peak of about 20° C. or less, in some embodiments about 15° C. or less, in some embodiments about 10° C. or less, and in some embodiments, about 5° C. or less. The latent heat of fusion ($\Delta H_f$), latent heat of crystallization ($\Delta H_c$), crystallization temperature, and width at the half height of the crystallization and endothermic peaks may all be determined as is well known in the art using differential scanning calorimetry ("DSC") in accordance with ASTM D-3417.

Due to the increase in the crystallization temperature, the temperature window between the glass transition temperature and crystallization temperature is also increased, which provides for greater processing flexibility by increasing the residence time for the material to crystallize. For example, the temperature window between the crystallization temperature and glass transition temperature of the thermoplastic composition may be about 20° C. apart, in some embodiments about 40° C. apart, and in some embodiments greater than about 60° C. apart.

In addition to possessing a higher crystallization temperature and broader temperature window, the thermoplastic composition may also exhibit improved proccessability due to a lower apparent viscosity and higher melt flow rate than polylactic acid alone. Thus, when processed in equipment lower power settings can be utilized, such as using less torque to turn the screw of the extruder. The apparent viscosity may for instance, be reduced so that the ratio of polylactic acid viscosity to the thermoplastic composition viscosity is at least about 1.1, in some embodiments at least about 2, and in some embodiments, from about 15 to about 100. Likewise, the melt flow rate may be increased so that the ratio of the thermoplastic composition melt flow rate to the starting polylactic acid melt flow rate (on a dry basis) is at least about 1.5, in some embodiments at least about 5, in some embodiments at least about 10, and in some embodiments, from about 30 to about 100. In one particular embodiment, the thermoplastic composition may have a melt flow rate (dry basis) of from about 5 to about 80 grams per 10 minutes, in some embodiments from about 10 to about 70 grams per 10 minutes, and in some embodiments, from about 20 to about 45 grams per 10 minutes (determined at 230° C., 2.16 kg). Of course, the apparent viscosity, melt flow rate, etc. may vary depending on the intended application.

III. Fiber Formation

Fibers formed from the thermoplastic composition may generally have any desired configuration, including monocomponent, multicomponent (e.g., sheath-core configuration, side-by-side configuration, segmented pie configuration, island-in-the-sea configuration, and so forth), and/or multiconstituent (e.g., polymer blend). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer that is not generally considered biodegradable, such as polyolefins, e.g., polyethylene, polypropylene, polybutylene, and so forth; polytetrafluoroethylene; polyesters, e.g., polyethylene terephthalate, and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. More desirably, however, the additional polymer is biodegradable, such as aliphatic polyesters, such as polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), and polycaprolactone, and succinate-based aliphatic polymers (e.g., polybutylene succinate, polybutylene succinate adipate, and polyethylene succinate); aromatic polyesters; or other aliphatic-aromatic copolyesters.

Any of a variety of processes may be used to form fibers in accordance with the present invention. For example, the melt processed thermoplastic composition described above may be extruded through a spinneret, quenched, and drawn into the vertical passage of a fiber draw unit. The fibers may then be cut to form staple fibers having an average fiber length in the range of from about 3 to about 80 millimeters, in some embodiments from about 4 to about 65 millimeters, and in some embodiments, from about 5 to about 50 millimeters. The staple fibers may then be incorporated into a nonwoven web as is known in the art, such as bonded carded webs, through-air bonded webs, etc. The fibers may also be deposited onto a foraminous surface to form a nonwoven web.

Referring to FIG. 1, for example, one embodiment of a method for forming spunbond fibers is shown. In FIG. 1, for instance, the raw materials (e.g., polylactic acid, plasticizer, compatibilizer, etc.) are fed into an extruder 12 from a hopper 14. The raw materials may be provided to the hopper 14 using any conventional technique and in any state. The extruder 12 is driven by a motor (not shown) and heated to a temperature sufficient to extrude the melted polymer. For example, the extruder 12 may employ one or multiple zones operating at a temperature of from about 50° C. to about 500° C., in some embodiments, from about 100° C. to about 400° C., and in some embodiments, from about 150° C. to about 250° C. Typical shear rates range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. If desired, the extruder may also possess one or more zones that remove excess moisture from the polymer, such as vacuum zones, etc. The extruder may also be vented to allow volatile gases to escape.

Once formed, the thermoplastic composition may be subsequently fed to another extruder in a fiber formation line. Alternatively, as shown in FIG. 1, the thermoplastic composition may be directly formed into a fiber through a polymer conduit 16 to a spinneret 18. Spinnerets for extruding multicomponent filaments are well known to those of skill in the art. For example, the spinneret 18 may include a housing containing a spin pack having a plurality of plates stacked one on top of each other and having a pattern of openings arranged to create flow paths for directing polymer components. The spinneret 18 also has openings arranged in one or more rows. The openings form a downwardly extruding curtain of filaments when the polymers are extruded therethrough. The process 10 also employs a quench blower 20 positioned adjacent the curtain of filaments extending from the spinneret 18. Air from the quench air blower 20 quenches the filaments extending from the spinneret 18. The quench air may be directed from one side of the filament curtain as shown in FIG. 1 or both sides of the filament curtain. A fiber draw unit or aspirator 22 is positioned below the spinneret 18 and receives the quenched filaments. Fiber draw units or aspirators for use in melt spinning polymers are well-known in the art. Suitable fiber draw units for use in the process of the present invention include a linear fiber aspirator of the type shown in U.S. Pat. Nos. 3,802,817 and 3,423,255, which are incorporated herein in their entirety by reference thereto for all relevant purposes. The fiber draw unit 22 generally includes an elongate vertical passage through which the filaments are drawn by aspirating air entering from the sides of the passage and flowing downwardly through the passage. A heater or blower 24 supplies aspirating air to the fiber draw unit 22. The aspirating air draws the filaments and ambient air through the fiber draw unit 22. Thereafter, the filaments are formed into a coherent web structure by randomly depositing the filaments onto a forming surface 26 (optionally with the aid of a vacuum) and then bonding the resulting web using any known technique.

After quenching, the filaments are drawn into the vertical passage of the fiber draw unit 22 by a flow of a gas such as air, from the heater or blower 24 through the fiber draw unit. The flow of gas causes the filaments to draw or attenuate which increases the molecular orientation or crystallinity of the polymers forming the filaments. The filaments are deposited through the outlet opening of the fiber draw unit 22 and onto a godet roll 42. Due to the high strength of the filaments of the present invention, high draw down ratios may be employed in the present invention. The draw down ratio is the linear speed of the filaments after drawing (e.g., linear speed of the godet roll 42 or a foraminous surface (not shown) divided by the linear speed of the filaments after extrusion. For example, the draw ratio may be calculated in certain embodiments as follows:

$$\text{Draw Ratio} = A/B$$

wherein,

A is the linear speed of the fiber after drawing (i.e. godet speed) and is directly measured; and B is the linear speed of the extruded fiber and can be calculated as follows:

$$\text{Extruder linear fiber speed} = C/(25*\pi*D*E^2)$$

wherein,

C is the throughput through a single hole (grams per minute);

D is the density of the polymer (grams per cubic centimeter); and

E is the diameter of the orifice (in centimeters) through which the fiber is extruded. In certain embodiments of the present invention, the draw ratio may be from about 200:1 to about 6500:1, in some embodiments from about 500:1 to about 6000:1, and in some embodiments, from about 1000:1 to about 5000:1.

If desired, the fibers collected on the godet roll 42 may optionally be subjected to additional in line processing and/or converting steps (not shown) as will be understood by those skilled in the art. For example, staple fibers may be formed by "cold drawing" the collected fibers at a temperature below their softening temperature to the desired diameter, and thereafter crimping, texturizing, and/or and cutting the fibers to the desired fiber length. Besides being collected on a godet roll, the fibers may also be directly formed into a coherent web structure by randomly depositing the fibers onto a forming surface (optionally with the aid of a vacuum) and then bonding the resulting web using any known technique. For example, an endless foraminous forming surface may be positioned below the fiber draw unit and receive the filaments from an outlet opening. A vacuum may be positioned below the forming surface to draw the filaments and consolidate the unbonded nonwoven web.

Once formed, the nonwoven web may then be bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the polylactic acid(s) used to form the fibers. Suitable autogenous bonding techniques may include ultrasonic bonding, thermal bonding, through-air bonding, calendar bonding, and so forth. For example, the web may be further bonded or embossed with a pattern by a thermo-mechanical process in which the web is passed between a heated smooth anvil roll and a heated pattern roll. The pattern roll may have any raised pattern which provides the desired web properties or appearance. Desirably, the pattern roll defines a raised pattern which defines a plurality of bond locations which define a bond area between about 2% and 30% of the total area of the roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., as well as U.S. Design Pat. Nos. 428,267 to Romano et al.; 390,708 to Brown; 418,305 to Zander, et al.; 384,508 to Zander, et al.; 384,819 to Zander, et al.; 358,035 to Zander, et al.; and 315,990 to Blenke, et al., all of which are incorporated herein in their entirety by reference thereto for all purposes. The pressure between the rolls may be from about 5 to about 2000 pounds per lineal inch. The pressure between the rolls and the temperature of the rolls is balanced to obtain desired web properties or appearance while maintaining cloth like properties. As is well known to those skilled in the art, the temperature and pressure required may vary depending upon many factors including but not limited to, pattern bond area, polymer properties, fiber properties and nonwoven properties.

In addition to spunbond webs, a variety of other nonwoven webs may also be formed from the thermoplastic composition in accordance with the present invention, such as meltblown webs, bonded carded webs, wet-laid webs, airlaid webs, coform webs, hydraulically entangled webs, etc. For example, the thermoplastic composition may be extruded through a plurality of fine die capillaries into a converging high velocity gas (e.g. air) streams that attenuate the fibers to reduce their diameter. Thereafter, the meltblown fibers are carried by the high velocity gas stream and are deposited on a collecting surface to form a web of randomly dispersed meltblown fibers. Alternatively, the polymer may be formed into a carded web by placing bales of fibers formed from the thermoplastic composition into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

If desired, the nonwoven web may also be a composite that contains a combination of the thermoplastic composition fibers and other types of fibers (e.g., staple fibers, filaments, etc). For example, additional synthetic fibers may be utilized, such as those formed from polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; etc. If desired, biodegradable polymers, such as poly(glycolic acid) (PGA), polylactic acid (PLA), poly(β-malic acid) (PMLA), poly(ε-caprolactone) (PCL), poly(p-dioxanone) (PDS), poly (butylene succinate) (PBS), and poly(3-hydroxybutyrate) (PHB), may also be employed. Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Polylactic acid staple fibers may also be employed, such as those commercially available from Far Eastern Textile, Ltd. of Taiwan.

The composite may also contain pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), bamboo, combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Washington under the trade designation of "NF-405." Another suitable pulp for use in the present invention is a bleached, sulfate wood pulp containing primarily softwood fibers that is available from Bowater Corp. with offices in Greenville, S.C. under the trade name CoosAbsorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability. Bamboo or cotton fibers may also be employed.

Nonwoven composites may be formed using a variety of known techniques. For example, the nonwoven composite may be a "coform material" that contains a mixture or stabilized matrix of the thermoplastic composition fibers and an absorbent material. As an example, coform materials may be made by a process in which at least one meltblown die head is arranged near a chute through which the absorbent materials are added to the web while it is forming. Such absorbent materials may include, but are not limited to, pulp fibers, superabsorbent particles, inorganic and/or organic absorbent materials, treated polymeric staple fibers, and so forth. The relative percentages of the absorbent material may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % thermoplastic composition fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent material. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.; which are incorporated herein in their entirety by reference thereto for all purposes.

Nonwoven laminates may also be formed in the present invention in which one or more layers are formed from the thermoplastic composition. For example, the nonwoven web of one layer may be a spunbond that contains the thermoplastic composition, while the nonwoven web of another layer contains thermoplastic composition, other biodegradable polymer(s), and/or any other polymer (e.g., polyolefins). In one embodiment, the nonwoven laminate contains a meltblown layer positioned between two spunbond layers to form a spunbond/meltblown/spunbond ("SMS") laminate. If desired, the spunbond layer(s) may be formed from the thermoplastic composition. The meltblown layer may be formed from the thermoplastic composition, other biodegradable polymer(s), and/or any other polymer (e.g., polyolefins). Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the nonwoven web or laminate may be applied with various treatments to impart desirable characteristics. For example, the web may be treated with liquid-repellency additives, antistatic agents, surfactants, colorants, antifogging agents, fluorochemical blood or alcohol repellents, lubricants, and/or antimicrobial agents. In addition, the web may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. No. 4,215,682 to Kubik, et al.; U.S. Pat. No. 4,375,718 to Wadsworth; U.S. Pat. No. 4,592,815 to Nakao; U.S. Pat. No. 4,874,659 to Ando; U.S. Pat. No. 5,401,446 to Tsai, et al.; U.S. Pat. No. 5,883,026 to Reader, et al.; U.S. Pat. No. 5,908,598 to Rousseau, et al.; U.S. Pat. No. 6,365,088 to Knight, et al., which are incorporated herein in their entirety by reference thereto for all purposes.

IV. Articles

The nonwoven web may be used in a wide variety of applications. For example, the web may be incorporated into a "medical product", such as gowns, surgical drapes, facemasks, head coverings, surgical caps, shoe coverings, sterilization wraps, warming blankets, heating pads, and so forth. Of course, the nonwoven web may also be used in various other articles. For example, the nonwoven web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, a nonwoven web formed according to the present invention may be used to form an outer cover of an absorbent article. If desired, the nonwoven web may be laminated to a liquid-impermeable film that is either vapor-permeable or vapor-impermeable.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, the melt flow rate was measured in accordance with ASTM Test Method D1239 with a Tinius Olsen Extrusion Plastometer.

Thermal Properties:

The melting temperature, glass transition temperature and degree of crystallinity of a material was determined by differential scanning calorimetry (DSC). The differential scanning calorimeter was a DSC Q100 Differential Scanning calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools were used. The samples were placed into an aluminum pan and weighed to an accuracy of 0.01 milligram on an analytical balance. A lid was crimped over the material sample onto the pan. Typically, the resin pellets were placed directly in the weighing pan, and the fibers were cut to accommodate placement on the weighing pan and covering by the lid.

The differential scanning calorimeter was calibrated using an indium metal standard and a baseline correction was performed, as described in the operating manual for the differential scanning calorimeter. A material sample was placed into the test chamber of the differential scanning calorimeter for testing, and an empty pan is used as a reference. All testing was run with a 55-cubic centimeter per minute nitrogen (industrial grade) purge on the test chamber. For resin pellet samples, the heating and cooling program was a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program was a 1-cycle test that began with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing was run with a 55-cubic centimeter per minute nitrogen (industrial grade) purge on the test chamber.

The results were then evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature was identified as the region on the plot-line where a distinct change in slope occurred, and the melting temperature was determined using an automatic inflection calculation. The areas under the peaks on the DSC plots were determined in terms of joules per gram of sample (J/g). For example, the heat of fusion of a resin or fiber sample ($\Delta H_f$) was determined by integrating the area of the endothermic peak. The area values were determined by converting the areas under the DSC plots (e.g. the area of the endotherm) into the units of joules per gram (J/g) using computer software. The exothermic heat of crystallization ($\Delta H_c$) was determined during the first cooling cycle. In certain cases, the exothermic heat of crystallization was also determined during the first heating cycle ($\Delta H_{c1}$) and the second cycle ($\Delta H_{c2}$).

If desired, the % crystallinity may also be calculated as follows:

% crystallinity=100*(A−B)/C wherein,

A is the sum of endothermic peak areas during the heating cycle (J/g);

B is the sum of exothermic peak areas during the heating cycle (J/g); and

C is the heat of fusion for the selected polymer where such polymer has 100% crystallinity (J/g). For polylactic acid, C is 93.7 J/g (Cooper-White, J. J., and Mackay, M. E., *Journal of Polymer Science*, Polymer Physics Edition, p. 1806, Vol. 37, (1999)). The areas under any exothermic peaks encountered in the DSC scan due to insufficient crystallinity may also be subtracted from the area under the endothermic peak to appropriately represent the degree of crystallinity.

Tensile Properties:

Individual fiber specimens were shortened (e.g. cut with scissors) to 38 millimeters in length, and placed separately on a black velvet cloth. 10 to 15 fiber specimens were collected in this manner. The fiber specimens were then mounted in a substantially straight condition on a rectangular paper frame having external dimension of 51 millimeters×51 millimeters and internal dimension of 25 millimeters×25 millimeters. The ends of each fiber specimen were operatively attached to the frame by carefully securing the fiber ends to the sides of the frame with adhesive tape. Each fiber specimen was then be measured for its external, relatively shorter, cross-fiber dimension employing a conventional laboratory microscope, which has been properly calibrated and set at 40× magnification. This cross-fiber dimension was recorded as the diameter of the individual fiber specimen. The frame helped to mount the ends of the sample fiber specimens in the upper and lower grips of a constant rate of extension type tensile tester in a manner that avoided excessive damage to the fiber specimens.

A constant rate of extension type of tensile tester and an appropriate load cell were employed for the testing. The load cell was chosen (e.g. 10N) so that the test value fell within 10-90% of the full scale load. The tensile tester (i.e., MTS SYNERGY 200) and load cell were obtained from MTS Systems Corporation of Eden Prairie, Mich. The fiber specimens in the frame assembly were then mounted between the grips of the tensile tester such that the ends of the fibers were operatively held by the grips of the tensile tester. Then, the sides of the paper frame that extended parallel to the fiber length were cut or otherwise separated so that the tensile tester applied the test force only to the fibers. The fibers were then subjected to a pull test at a pull rate and grip speed of 12 inches per minute. The resulting data was analyzed using a TESTWORKS 4 software program from the MTS Corporation with the following test settings:

| Calculation Inputs | | Test Inputs | |
|---|---|---|---|
| Break mark drop | 50% | Break sensitivity | 90% |
| Break marker elongation | 0.1 in | Break threshold | 10 $g_f$ |
| Nominal gage length | 1 in | Data Acq. Rate | 10 Hz |
| Slack pre-load | 1 $lb_f$ | Denier length | 9000 m |
| Slope segment length | 20% | Density | 1.25 g/cm³ |
| Yield offset | 0.20% | Initial speed | 12 in/min |
| Yield segment length | 2% | Secondary speed | 2 in/min |

The tenacity values were expressed in terms of gram-force per denier. Peak elongation (% strain at break) was also measured.

Example 1

Three blends were formed from polylactic acid (PLA 6202, Natureworks), maleic anhydride-modified polypropylene copolymer (Fusabond® MD-353D, Du Pont), and polyethylene glycol (Carbowax® PEG-3350, Dow Chemicals). More specifically, a co-rotating, twin-screw extruder was employed (ZSK-30, diameter) to form the blend that was manufactured by Werner and Pfleiderer Corporation of Ramsey, N.J. The screw length was 1328 millimeters. The extruder had 14 barrels, numbered consecutively 1-14 from the feed hopper to the die. The first barrel (#1) received the PLA resin, PEG-3350 powder and Fusabond® 353D resin via 3 separate gravimetric feeders at a total throughput of 18 to 21 pounds per hour. The temperature profile of the barrels was 80° C., 150° C., 175° C., 175° C., 175° C., 150° C., 150° C., respectively. The screw speed was 180 revolutions per minute ("rpm"). The die used to extrude the resin had 2 die openings (6 millimeters in diameter) that were separated by 4 millimeters. Upon formation, the extruded resin was cooled on a fan-cooled conveyor belt and formed into pellets by a Conair pelletizer. The results are set forth below in Table 1 along with the blend ratios and the extrusion parameters.

TABLE 1

| Sample | PLA 6202 (wt. %) | Fusabond (wt. %) | PEG (wt. %) | PEG to Fusabond Ratio | Throughput (lb/hr) | Melt Pressure (psi) | Motor Torque (%) | Moisture content (ppm) | Meltflow rate @190° C., (g/10 min) |
|---|---|---|---|---|---|---|---|---|---|
| A | 66.6 | 16.7 | 16.7 | 1:1 | 18 | 90-100 | 29-38 | 1208 | 64 |
| B | 60.0 | 10.0 | 30.0 | 3:1 | 20 | 60-70 | 29-36 | 2319 | 190 |
| C | 66.7 | 11.1 | 22.2 | 2:1 | 18 | 90-100 | 31-39 | 1441 | 77 |

Each of the concentrates was then dry blended with virgin polylactic acid PLA 6201, Natureworks) having a moisture content of less than 100 ppm to create Samples 1-9. The size of each dry blended batch was 1000 grams. The final composition of the blends is shown below in Table 2.

TABLE 2

| Sample | PLA 6201 (wt. %) | PLA 6202 (wt. %) | Total PLA (wt. %) | Fusabond (wt. %) | PEG (wt. %) |
|---|---|---|---|---|---|
| PLA Control | 100 | — | 100 | — | — |
| 1 | 66.25 | 22.50 | 88.75 | 4.75 | 6.50 |
| 2 | 77.50 | 15.00 | 92.50 | 3.50 | 4.00 |
| 3 | 76.25 | 15.75 | 92.00 | 4.00 | 4.00 |
| 4 | 61.40 | 25.60 | 87.00 | 6.50 | 6.50 |
| 5 | 55.00 | 30.00 | 85.00 | 6.00 | 9.00 |
| 6 | 79.00 | 14.00 | 93.00 | 3.00 | 4.00 |
| 7 | 46.50 | 35.50 | 82.00 | 9.00 | 9.00 |
| 8 | 70.00 | 18.00 | 88.00 | 3.00 | 9.00 |
| 9 | 26.30 | 18.30 | 92.00 | 3.00 | 5.00 |

Example 2

The compounded samples of Example 1 (Samples 1-9) were fed into a single heated spin pack assembly to form filaments. The filaments exiting the spinneret were quenched via forced air ranging from ambient temperature to 120° C. and a linear draw force was applied using a godet at speeds up to 3000 meters per minute. Blends were processed at a throughput of 0.23 gram per hole per minute through a 16 hole die. The fiber spinning conditions are set forth below in Table 3.

TABLE 3

| Sample | Melt Temp. (° C.) | Pack Pressure (psi) | Extruder Control Pressure (psi) | Melt Pump Speed (rpm) | Extruder Screw Speed (rpm) | Heated Quench Air | Godet Speed (m/min) | Draw Ratio |
|---|---|---|---|---|---|---|---|---|
| PLA Control | 240 | 225 | 600 | 5 | 4 | Yes | 2750 | 4261 |
| 1 | 240 | 135 | 500 | 5 | 54 | Yes | 3000 | 4648 |
| 2 | 240 | 175 | 500 | 5 | 50 | Yes | 3000 | 3873 |
| 3 | 240 | 185 | 500 | 5 | 32 | Yes | 3000 | 4648 |
| 4 | 240 | 105 | 490 | 5 | 58 | Yes | 2500 | 3873 |
| 5 | 215 | 170 | 500 | 5 | 30 | Yes | 1400 | 2169 |
| 6 | 240 | 230 | 500 | 5 | 37 | Yes | 3000 | 4648 |
| 7 | 240 | 95 | 500 | 5 | 68 | Yes | 1400 | 2169 |
| 8 | 240 | 100 | 500 | 5 | 68 | Yes | 2200 | 3408 |
| 9 | 240 | 155 | 500 | 5 | 44 | Yes | 3000 | 4648 |

Fibers were then tested for tenacity and elongation as described above, The results are set forth below in Table 4.

TABLE 4

| | Physical Properties | |
|---|---|---|
| Sample | Avg. Tenacity | Avg. Elongation at Peak (%) |
| PLA Control | 2.36 | 40 |
| 1 | 2.01 | 46 |
| 2 | 1.94 | 61 |
| 3 | 1.85 | 34 |
| 4 | 1.75 | 59 |
| 5 | 1.22 | 42 |
| 6 | 1.87 | 36 |
| 7 | 1.42 | 66 |
| 8 | 1.79 | 61 |
| 9 | 1.85 | 53 |

As indicated, the samples produced average tenacities ranging from 1.22 to 2.01. The PLA control produced a tenacity of 2.36. It was observed that higher additive concentrations produced greater elongations due to the reduction in PLA, which would otherwise cause the fibers to be stiff and brittle. The samples with a higher compatibilizer concentration produced the best elongation in the fibers. Only two samples (those with minimal additive) produced elongations lower than PLA alone (40%). The remainder of the samples performed equal to or better than PLA in terms of fiber elongation.

Thermal properties of the blends were also measured using Digital Scanning calorimeter (DSC). A heat-cool cycle was used to simulate the effect of bonding. Eight (8) responses were measured through DSC testing and shown below in Table 5.

TABLE 5

| Sample | $T_g$ (° C.) | $T_m$ (° C.) | $\Delta W_f^{1/2}$ | $\Delta H_{c1}$ (J/g) | $\Delta H_f$ (J/g) | $\Delta H_{c2}$ (J/g) | $T_c$ (° C.) | $\Delta W_c^{1/2}$ |
|---|---|---|---|---|---|---|---|---|
| | 1st Heat | | | | | 1st Cool | | |
| 1 | 49.96 | 159.81 | 7.5 | 3.132 | 39.96 | 29.22 | 100.85 | 10.34 |
| 2 | 53.06 | 160.04 | 8.79 | 3.784 | 40.08 | 27.99 | 98.4 | 10.18 |
| 3 | 57.1 | 163.89 | 3.88 | 3.761 | 44.24 | 19.87 | 97.2 | 12.72 |
| 4 | 51.45 | 159.6 | 7.54 | 5.74 | 39.86 | 26.09 | 98.92 | 10.16 |
| 5 | 48.72 | 160.49 | 8.45 | 10.55 | 41.51 | 32.47 | 99.84 | 10.4 |
| 6 | 56.34 | 162.46 | 6.6 | 4.639 | 40.81 | 22.77 | 98 | 11.02 |
| 7 | 50.34 | 164.82 | 6.47 | 8.323 | 38.8 | 29.4 | 97.71 | 16.62 |
| 8 | 50.55 | 160.25 | 7.78 | 5.675 | 39.91 | 24.17 | 98.17 | 13.41 |
| 9 | 51.34 | 161.33 | 6.32 | 3.195 | 40.64 | 25.45 | 100.03 | 9.86 |

As indicated, the glass transition temperature was lowered for all samples compared to the typical value for PLA of 63° C. The lowest glass transition temperatures were exhibited by the sample with the greatest PEG content. Further, the addition of the Fusabond®-PEG broadened the melt peak of the PLA, which provided a larger bonding window for the fibers. An unexpected benefit of the Fusabond®-PEG addition was an improvement on rate of crystallization as indicated by the width of the crystallization peak, which ranged from 10° C. to 17° C.

Example 3

Various concentrates were formed by pre-melt blending polylactic acid (PLA 6201, Natureworks), maleic anhydride-modified polypropylene copolymer (Fusabond® MD-353D, Du Pont), and polyethylene glycol (Carbowax® PEG-3350, Dow Chemicals) and then dry blending with virgin polylactic acid (PLA 6202, Natureworks) as described in Example 1. Table 6 shows the blends run during the trial and the basis weight of the webs produced.

TABLE 6

| Code | PLA 6201 (wt. %) | PLA 6202 (wt. %) | Fusabond MD-353D (wt. %) | PEG 3350 (wt. %) | Basis Weight (gsm) |
|---|---|---|---|---|---|
| PP Control | 100% polypropylene (PP 3155, ExxonMobil) | | | | 17 |
| 10 | 80 | 13.4 | 2.2 | 4.4 | 17 |
| 11 | 80 | 13.4 | 2.2 | 4.4 | 22 |
| 12 | 70 | 20.1 | 3.3 | 6.6 | 22 |
| 13 | 70 | 20.1 | 3.3 | 6.6 | 17 |

Each of the samples was processed using the same extrusion temperature profile of 200° C., 215° C., 215° C., 215° C., 215° C., and 215° C. The melt blend went from the extruder to a melt pump turning at 15.9 rpm that resulted in a throughput of 0.65 grams per hole per minute on the 64 hole per inch spinpack. The melt was extruded through the spinpack to form continuous fibers which were then quenched using forced air supplied by a blower a temperature of 15° C. The continuous fibers were then drawn through a fiber drawn unit elongating the fibers and sending them through a set of deflector teeth to improve the scattering of the fibers on the forming wire. Once fibers were on the wire, they were subjected to heated air to impart slight bonding and integrity to the web so it could be transported to a thermal calendar. The calendar was heated by hot oil at a temperature of 140° C. and consisted of a bottom crowned anvil roll and a patterned top roll which were loaded at a pressure of 30 psi. After the calendar, the webs were wound onto a roll through the use of a drum winder. The resulting tensile and elongation properties of the webs were tested and the results are shown in Table 7.

TABLE 7

| Sample | MD peak tensile (g/2 inch) | MD strain @ peak (%) | CD peak tensile (g/2 inch) | CD strain @ peak (%) |
|---|---|---|---|---|
| PP Control | 3009 | 39.5 | 1635 | 39.4 |
| 10 | 2547 | 16.9 | 690 | 30.8 |
| 11 | 4200 | 20 | 1063 | 27 |
| 12 | 2391 | 16 | 1604 | 32.5 |
| 13 | 2296 | 16 | 1213 | 35.4 |

Sample 13 was then subjected to an aging study to determine the durability of the plasticizer with the addition of the compatibilizing agent. Two aging conditions were used to study the effect. The first chamber was an accelerated aging chamber where materials were subjected to 45° C. and 75% relative humidity. The second chamber was also an accelerated aging chamber where materials were subjected to 55° C. dry air. The spunbond web was cut into full width sheets 12 inches in length. Prior to placing material into the chambers, a baseline was established by testing 10 machine direction and 10 cross direction samples for peak tensile and the strain at the peak load. Samples were then stored flat in the aging chambers. Material samples were tested at 1 week and 1 month of aging to determine if there was any loss in tensile strength as measure by peak load or a loss in ductility as measured by the peak strain. The test results from the aging study are shown in Table 8.

TABLE 8

| Sample | Time 0 | 1 week @ 40° C./ 75% RH | 1 month @ 40° C./75% RH | 1 week @ 55° C. | 1 month @ 55° C. |
|---|---|---|---|---|---|
| | | Peak Load (g) | | | |
| MD | 2231.68 | 2144.11 | 2036.34 | 1924.17 | 2268.34 |
| CD | 1054.16 | 926.92 | 1029.04 | 857.82 | 946.93 |
| | | Strain At Peak (%) | | | |
| MD | 19.24 | 15.41 | 11.95 | 16.5 | 18.22 |
| CD | 31.56 | 26.49 | 24.74 | 27.28 | 27.14 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A biodegradable fiber, the fiber being formed from a thermoplastic composition comprising at least one polylactic acid in an amount from about 55 wt. % to about 97 wt. %, at least one plasticizer in an amount from about 2 wt. % to about 25 wt. %, wherein the plasticizer includes an alkylene glycol, and at least one compatibilizer in an amount of from about 1 wt. % to about 20 wt. %, wherein the compatibilizer compatibilizes the polylactic acid and the plasticizer and includes a polyolefin modified with a polar compound, the polar compound including an organic acid, an anhydride of an organic acid, an amide of an organic acid, or a combination thereof.

2. The biodegradable fiber of claim 1, wherein the polylactic acid contains monomer units derived from L-lactic acid, D-lactic acid, meso-lactic acid, or mixtures thereof.

3. The biodegradable fiber of claim 1, wherein the alkylene glycol includes polyethylene glycol.

4. The biodegradable fiber of claim 1, wherein the polyolefin is derived from an α-olefin monomer having from 2 to 6 carbon atoms.

5. The biodegradable fiber of claim 4, wherein the polyolefin includes polyethylene, an ethylene copolymer, polypropylene, a propylene copolymer, or a combination thereof.

6. The biodegradable fiber of claim 1, wherein the polar compound includes an acid anhydride.

7. The biodegradable fiber of claim 6, wherein the acid anhydride includes maleic anhydride.

8. The biodegradable fiber of claim 1, wherein the polar compound constitutes from about 0.2 wt. % to about 10 wt. % of the compatibilizer.

9. The biodegradable fiber of claim 1, wherein the polar compound constitutes from about 1 wt. % to about 3 wt. % of the compatibilizer.

10. The biodegradable fiber of claim 1, wherein the compatibilizer has a melt flow index of from about 100 to about 600 grams per 10 minutes, measured at a load of 2160 grams and at a temperature of 190° C. in accordance with ASTM D1238-E.

11. The biodegradable fiber of claim 1, wherein the compatibilizer has a melt flow index of from about 200 to about 500 grams per 10 minutes, measured at a load of 2160 grams and at a temperature of 190° C. in accordance with ASTM D1238-E.

12. The biodegradable fiber of claim 1, wherein the compatibilizer constitutes from about 4 wt. % to about 10 wt. % of the thermoplastic composition.

13. The biodegradable fiber of claim 1, wherein the plasticizer constitutes from about 5 wt. % to about 10 wt. % of the thermoplastic composition.

14. The biodegradable fiber of claim 1, wherein the polylactic acid constitutes from about 75 wt. % to about 92 wt. % of the thermoplastic composition.

15. The biodegradable fiber of claim 1, wherein the thermoplastic composition has a glass transition temperature of from about 10° C. to about 55° C.

16. The fiber of claim 1 wherein the latent heat of crystallization of the thermoplastic composition during the first cooling cycle is about 10 J/g or more, as determined using differential scanning calorimetry in accordance with ASTM D-3417.

17. The fiber of claim 1, wherein the thermoplastic composition exhibits a width at the half height of the crystallization peak of about 20° C. or less, as determined using differential scanning calorimetry in accordance with ASTM D-3417.

* * * * *